Feb. 4, 1941.   H. C. DANISCHEWSKY   2,230,794
SOUND TESTING DEVICE
Filed Aug. 16, 1939
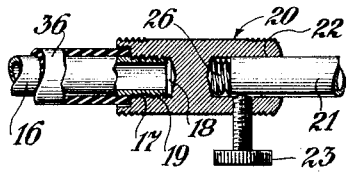
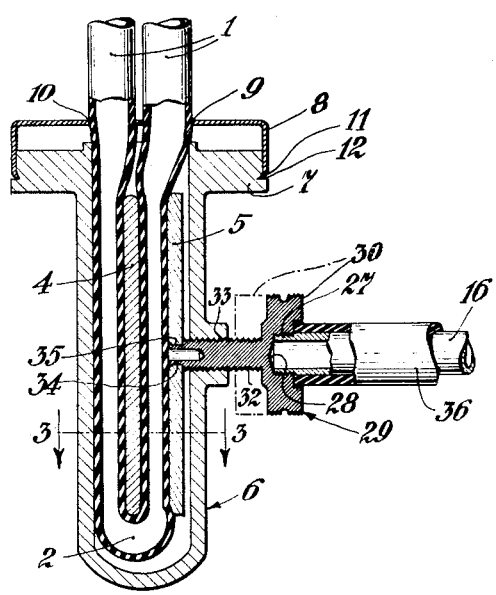
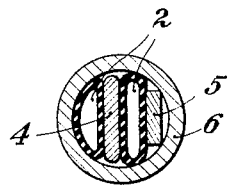
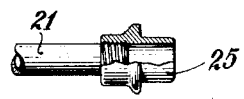
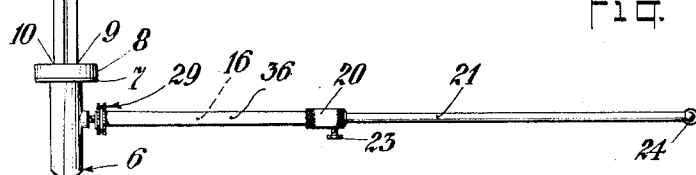
INVENTOR.
HERBERT C. DANISCHEWSKY
BY Frederick E. Hahne Patented Feb. 4, 1941

2,230,794

UNITED STATES PATENT OFFICE 2,230,794

SOUND TESTING DEVICE

Herbert C. Danischewsky, Copenhagen, Denmark

Application August 16, 1939, Serial No. 290,525

9 Claims. (Cl. 181—24)

My invention relates to improvements in sound testing devices, particularly to improvements in pick-up device for devices for testing and locating sounds originating in technical structures of any kind. A device according to my invention can be used, for instance for locating sounds of any kind originating in an internal combustion engine, for comparing the working of the cylinders of such an engine, for locating squeaks in technical structures, for instance in automobile chassis and bodies, for testing the sound insulation of walls, buildings, etc.

One object of my invention is to provide means by which sounds which are to be tested and located can be picked up and transmitted, while simultaneously being amplified, to the ear of a listener or a sound recording device.

Another object of my invention is to accomplish the transmission and amplification of sounds to be tested and located without employing any electrical supply or complicated acoustic devices.

Another object of my invention is to provide a pick-up device for a sound testing device with means by which the volume of the transmitted and amplified sounds can be regulated.

Another object of my invention is to arrange and construct these volume control means in such a manner that the volume control can be operated by the same hand which holds the device itself.

Another object of my invention is to provide a pick-up device according to my invention with a test arm by which technical structures to be tested can be easily checked. This test arm can be provided with a detachable extension and may end in a pick-up. This pick-up may be detachable, too.

Another object of my invention is to provide a housing in which the vital elements of my device are enclosed and which unites all elements into a technical unit which is very durable and easy to handle.

Other and further objects and advantages of my invention will be hereinafter set forth and the novel features thereof defined by the appended claims.

In the accompanying drawing an embodiment of a pick-up device for a sound testing device according to my invention is shown.

Fig. 1 shows a side view of a device according to my invention on a reduced scale.

Fig. 2 is a longitudinal section of the sound amplifying and transmitting elements.

Fig. 3 is a cross-section along line 3—3 of Fig. 2.

Fig. 4 is a fragmentary longitudinal section of the test arm and its connection with an extension on an enlarged scale, and Fig. 5 is a longitudinal section of a second embodiment of a pick-up device according to my invention on an enlarged scale.

The pick-up device according to my invention comprises a tube 1 of rubber or similar flexible material. The tube forms a loop 2 both halves of which are separated by a plate 4. This plate may consist of lead, wood or any other solid material, preferably one which does not vibrate appreciably. A plate 5 lies close against one half of the loop 2. This plate 5 may consist of iron or any other rigid material which is capable of a high degree of vibration. Loop 2, spacer 4 and plate 5 are enclosed in a housing 6. This housing may be tubular in shape and is closed at one end. Its open end is provided with a flange 7 which may or may not be integral with the walls of housing 6. The open end of housing 6 is closed by a cover 8 in which two apertures 9 and 10 are provided for the passage of the two halves of the loops. Cover 8 may be secured by any suitable means to flange 7, for instance by an inwardly bent edge 11 which engages an annular groove 12 in flange 7. Housing 6 may consist of metal, synthetic resin, or any other suitable material. The shape of the housing is not limited to the illustrated sample but may be changed in various details and adapted to the peculiar circumstances, for instance, flange 7 can be omitted entirely and the housing may have the form of a handle. Each of the two ends of rubber tube 1 is connected with a metal tube 13 which tubes end in earphones 14. The two tubes 13 are held together by an arched spring 15 which is secured by suitable means to tubes 13. As Fig. 1 illustrates, rubber tube 1 and metal tubes 13 with their earphones 14 are arranged like the corresponding parts of a conventional stethoscope. However, it is also possible to provide other means by which the both ends of rubber tube 1 can be brought close to the ears of a listener and held there in a convenient manner.

The purpose of plate 5 is to transmit sound waves resulting from sounds to be tested and located to loop 2 thus vibrating the air in rubber tube 1. The means for picking up the sounds to be tested and located and for transmitting them to plate 5 comprise a tube 16 of metal or other rigid material capable of a high degree of vibration. At both ends of tube 16 an external thread is provided. Thread 17 is screwed into a bore 18 having an internal thread 19 of a coupling element 20 which may consist of metal, synthetic resin or other suitable material. This coupling element serves to connect tube 16 with an extension tube 21 which fits into a corresponding boring 22 of coupling element 20 and is secured in this bore by a set screw 23. The free end of extension tube 21 carries an element 24 which I shall hereinafter call a "pick-up". This pick-up may have the form of a closed button or ball as shown in Fig. 1 or it may have an opening aligned with tube 21. Fig. 5 shows such an open pick-up 25. The pick-up is secured to tube 21 by providing one or both ends of tube 21 and the pick-up element with corresponding threads. Fig. 4 shows an external thread 26 at the one end of extension 21. I have found that a closed button 24 transmits less sound waves than an open pick-up 25 if brought in close contact with a part from which a sound of given strength emanates. I therefore prefer to use closed pick-ups when the sound to be tested is strong and open pick-ups if the sound is weaker since a too strong sound is unpleasant to the ear and harder to distinguish from similar sounds. Instead of one extension several extensions can be used and instead of a rigid metal tube 21 a solid rod or a flexible extension can be provided. It is also possible to dispense with an extension altogether and to attach the pick-up directly to tube 16. Under certain circumstances a particular pick-up can be omitted altogether.

The other end of tube 16 is screwed with its threaded part 27 into a corresponding threaded bore 28 of a coupling and control element 29. This element 29 consists of a head 30 preferably provided with a knurled edge to give a secure grip and a cylindrical extension 32 provided with an external thread. This extension is passed through an aperture 33 in the side wall of housing 6 have a corresponding internal thread. At the end of the threaded extension 32 another extension 34 is provided which is passed through a corresponding hole 35 in plate 5. The projecting end of extension 34 is loosely riveted by suitable means to secure plate 5 to coupling element 29. Preferably, the edge of hole 35 where the riveting takes place is countersunk. By this arrangement I can regulate the pressure which is exercised by plate 5 against rubber tube 1 by screwing coupling member 29 more or less deep into the threaded aperture 33 of housing 6. Fig. 2 shows the coupling and controlling element 29 in its raised position in full lines. The lowest possible position of element 29 is indicated in dot-dash lines. In this lowered position tube 1 will be nearly completely or completely choked. I have found that the sound volume which is transferred from the pick-up over tubes 21 and 16 and plate 5 to rubber tube 1 is dependent on the pressure with which plate 5 lies against tube 1. Consequently, the sound volume transmitted can be easily and exactly controlled by regulating the position of element 29.

The rivet connection between control element 29 and plate 5 has the advantage that control element 29 can never be screwed out completely. I hereby prevent the danger of a loss of tube 16 and the connected parts. Under certain circumstances such a precautionary measure will not be necessary or desirable. A simple screw connection between parts 29 and 5 will be sufficient.

My invention is not limited to the illustrated coupling between tube 16 and plate 5. It is essential only that means are provided by which the pressure of plate 5 against tube 1 can be regulated.

Tube 16 is covered by a tube 36 of rubber or similar material. Such a rubber tube gives a firm grip and insulates the hands of a person testing for instance sounds of an automobile engine against electric shocks.

If a pick-up device according to my invention is to be used, for instance for locating a squeak in a body of an automobile, the earphones are slipped over the ears of a person performing the test. Then pick-up 24 is brought into close contact with a part of the body near which the squeak seems to originate. The sound waves emanating from the sound searched for will be transmitted from the pick-up through tube 21, tube 16, control element 29 to plate 5 and from that plate to the air enclosed in tube 1 to earphones 14. The volume of the sound to be tested will be amplified by the combined effect of plate 5, tube 1, and intermediate plate 4. The person using the device may then regulate the sound volume to a degree which is suitable to him. The regulation is effected by turning control element 29 inward or outward which can be done with the same hand that holds housing 6. I have found that the amplification is very effective. If the sound to be located is comparatively loud it is often necessary to reduce the amplification considerably. After having set the amplification properly the user moves the pick-up over the suspected parts and since the volume of the sound heard in the earphones will increase when he approaches the location of the sound he will be able to spot the exact location of the squeak in a short time.

Two cylinders of an internal combustion engine can be tested, for instance in such a manner that first one is tested and then the amplification is so much reduced that the sound of this cylinder just disappears. Then if the other cylinder is tested and a sound is audible it proves that the two cylinders do not work alike.

My invention is not limited to the embodiment shown but various changes may be made without departing from the spirit of the invention.

Having thus described my invention what I claim as new and desire to secure by Letters Patent is:

1. A pick-up device for a sound testing device comprising a closed container of flexible material forming an air chamber, a plate of rigid material lying close against said container for transmitting sound waves from said plate to said flexible container, an arm of rigid material for picking up sounds to be tested and located secured to said plate thus permitting the flux of sound waves from said arm to said plate, a housing enclosing said container and said plate and having an aperture in its wall through which said arm is passed, means for securing said arm in a certain position relative to said wall, whereby the pressure of said plate against said container and thus the sound volume transmitted can be controlled, and two flexible tubes connected with said flexible container.

2. A pick-up device for a sound testing device comprising a closed container of flexible material forming an air chamber, a plate of rigid material lying close against said container for transmitting sound waves from said plate to said flexible container, an arm or rigid material for picking up sounds to be tested and located secured to said plate thus permitting the flux of sound waves from said arm to said plate, a housing enclosing said container and said plate and having an aperture with an internal thread in its wall through which said arm is passed, an external thread on said arm adapted to be screwed into said internal thread for regulating and fixing the position of said arm relative to said wall whereby the pressure of said plate against said container and thus the sound volume transmitted can be controlled, and two flexible tubes connected with said closed container.

3. A pick-up device for a sound testing device comprising a closed container of flexible material forming an air chamber, a plate of rigid material lying close against said container for transmitting sound waves from said plate to said flexible container, an arm of rigid material for picking up sounds to be tested and located, a rivet connection between said arm and said plate for permitting the flux of sound waves from said arm to said plate, a housing enclosing said container and said plate and having an aperture with an internal thread in its wall through which said arm is passed, an external thread on said arm adapted to be screwed into said internal thread for regulating and fixing the position of said arm relative to said wall whereby the pressure of said plate against said container and thus the sound volume transmitted can be controlled, and two flexible tubes connected with said closed container.

4. A pick-up device for a sound testing device comprising a closed container of flexible material forming an air chamber, a plate of rigid material lying close against said container for transmitting sound waves from said plate to said flexible material, an arm of rigid material for picking up sounds to be tested and located secured to said plate thus permitting the flux of sound waves from said arm to said plate, a detachable extension of rigid material for said arm, a pick-up attachable to said extension a housing enclosing said container and said plate and having an aperture in its wall through which said arm is passed, means for securing said arm in a fixed position relative to said wall whereby the pressure of said plate against said container and thus the sound volume transmitted can be controlled, and two flexible tubes connected with said flexible container.

5. A pick-up device for a sound testing device comprising a closed container of flexible material forming an air chamber, a plate of rigid material lying close against said container for transmitting sound waves from said plate to said flexible container, an arm of rigid material for picking up sounds to be tested and located, an intermediate element closely connected with said arm and provided with an extension having an external thread, said intermediate element being closely connected with said plate thus permitting the flux of sound waves from said arm through said intermediate element to said plate, a housing enclosing said container and said plate and having an aperture with an internal thread in its wall, said extension being adapted to be screwed with its external thread into the internal thread of said aperture for regulating and fixing the position of said intermediate element and said arm relative to said wall whereby the pressure of said plate against said flexible container and thus the sound volume transmitted can be controlled, and two flexible tubes connected with said closed container.

6. A pick-up device for a sound testing device comprising a tube of flexible material forming a loop, a plate of rigid material lying close against one half of said loop for transmitting sound waves from said plate to said loop, an intermediate plate between the two halves of said loop, an arm of rigid material for picking up sounds to be tested and located secured to said first plate, thus permitting the flux of sound waves from said arm to said plate, a housing enclosing said loop, said intermediate plate and said first plate for transmitting sound waves and having an aperture in its wall through which said arm is passed, means for securing said arm in its position relative to said wall whereby the pressure of said first plate against said loop and thus the sound volume transmitted can be controlled.

7. A sound pick-up device for a testing device comprising a flexible tube forming a loop, a plate of rigid material lying close against one half of said loop for transmitting sound waves from said plate to said loop, an intermediate plate between the two halves of said loop, an arm of rigid material for picking up sounds to be tested and located secured to said first plate thus permitting a flux of sound waves from said arm to said plate, a housing enclosing said loop, said intermediate plate and said plate for transmitting sound waves, and having an aperture with an internal thread in its wall through which said arm is passed, an external thread on said arm adapted to be screwed into said internal thread for regulating and fixing the position of said arm relative to said wall whereby the pressure of said plate against said loop and thus the sound volume transmitted can be controlled, and one tube of rigid material connected with each end of said flexible tube.

8. A pick-up device for a sound testing device comprising a flexible tube forming a loop, a plate of rigid material lying close against one half of said loop for transmitting sound waves from said plate to said loop, an intermediate plate between the two halves of said loop, an arm of rigid material for picking up sounds to be tested and located secured to said first plate thus permitting a flux of sound waves from said arm to said plate, a detachable extension of rigid material for said arm, a pick-up button attachable to said extension, a housing enclosing said loop, said intermediate plate and said first plate for transmitting sound waves, and having an aperture in its wall through which said arm is passed, means for securing said arm in a fixed position relative to said wall, whereby the pressure of said first plate against said loop and thus the sound volume transmitted can be controlled, and one tube of rigid material connected with each end of said flexible tube.

9. A pick-up device for a sound testing device comprising a flexible tube forming a loop, a plate of rigid material lying close against one half of said loop for transmitting sound waves from said plate to said loop, an intermediate plate between the two halves of said loop, an arm of rigid material for picking up sounds to be tested and located, an intermediate element closely connected with said arm and provided with an extension having an external thread, said intermediate element being closely connected with said first plate, thus permitting the flux of sound waves from said arm through said intermediate element to said plate, a housing enclosing said loop, said intermediate plate and said first plate for transmitting sound waves, and having an aperture with an internal thread in its wall, said extension being adapted to be screwed with its external thread into the internal thread of said aperture for regulating and fixing the position of said intermediate element and said arm relative to said wall whereby the pressure of said first plate against said loop and thus the sound volume transmitted can be controlled and one tube of rigid material connected with each end of said flexible tube.

HERBERT C. DANISCHEWSKY.